Patented July 28, 1931

1,816,550

UNITED STATES PATENT OFFICE

NORBERT STEIGER, OF FRANKFORT-ON-THE-MAIN, GERMANY, ASSIGNOR TO GENERAL ANILINE WORKS, INC., OF NEW YORK, N. Y., A CORPORATION OF DELAWARE

INDIGOID VAT DYESTUFFS

No Drawing. Application filed April 11, 1930, Serial No. 443,621, and in Germany April 22, 1929.

My present invention relates to new asymmetrical indigoid vat dyestuffs which correspond to the general formula:

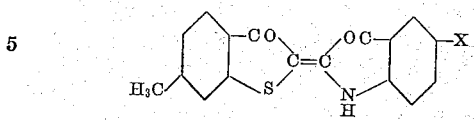

(wherein X means chlorine or bromine).

These dyestuffs dye animal and vegetable fibres grey shades and are very suitable for printing purposes. The dyeings and printings thus produced are distinguished by very good properties of fastness. Even light dyeings on wool show an excellent fastness to light and exposure.

In order to further illustrate my invention the following examples are given, the parts being by weight and all temperatures in centigrade degrees. I wish it however to be understood that I am not limited to the particular conditions nor to the specific products mentioned therein:—

Example 1

48 parts of 5-chloro-isatine are heated for 2 hours to 100–105° with 57.5 parts of phosphorus pentachloride and 600 parts of chloro-benzene. The solution of the α-chloride thus produced is mixed while stirring at about 80° with a solution of 46 parts of 6-methyl-3-hydroxy-thionaphthene in 600 parts of chloro-benzene. After stirring for about 1 hour the formed dyestuff is filtered off. It corresponds to the formula:

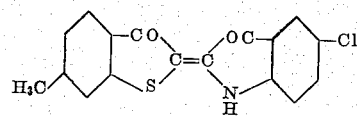

It represents a violettish black powder, soluble in sulfuric acid to a green solution, forming a yellow vat, yielding on cotton by printing and dyeing grey shades of a good fastness. Also wool is dyed from the vat grey shades. Even light dyeings on wool show an excellent fastness to light and exposure.

6-methyl-3-hydroxy-thionaphthene used as starting material may be produced for instance as follows:

1-methyl-4-amino-5-mercapto-benzene (prepared e. g. by subjecting dehydro-thiotoluidine to the action of melting alkali) is condensed in the known manner with monochloro-acetic acid and the 1-methyl-4-aminobenzene-5-thioglycollic acid thus formed is converted into 6-methyl-3-hydroxythio-naphthene in the usual way.

Example 2

11.5 parts of 5-bromo-isatine are heated for 2 hours to 100° with 11.5 parts of phosphorus pentachloride and 120 parts of chloro-benzene. The solution of the α-chloride thus produced is mixed while stirring at 80–85° with a solution of 8.3 parts of 6-methyl-3-hydroxy-thionaphthene in 120 parts of chloro-benzene. After stirring for about 1 hour the formed dyestuff is filtered off. It corresponds to the formula:

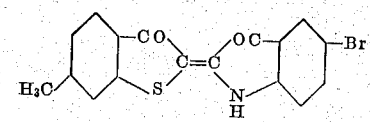

It represents a violettish black powder of nearly the same properties as the product of Example 1.

I claim:—

1. As new compounds the asymmetrical indigoid vat dyestuffs corresponding to the general formula:

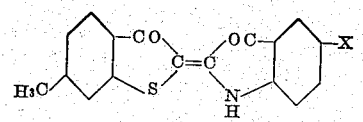

(wherein X means chlorine or bromine), which compounds are violettish black powders dyeing and printing wool and cotton grey shades of a very good fastness, especially to light and exposure.

2. As a new compound the asymmetrical indigoid vat dyestuff corresponding to the formula:

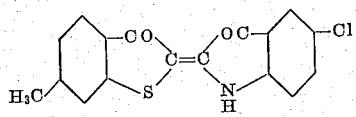

which compound is a violettish black powder dyeing and printing wool and cotton grey shades of a very good fastness, especially to light and exposure.

In testimony whereof, I affix my signature.

NORBERT STEIGER.